United States Patent
Thalhauser et al.

(10) Patent No.: US 9,683,495 B2
(45) Date of Patent: Jun. 20, 2017

(54) METHOD OF OPERATING AN INTERNAL COMBUSTION ENGINE COUPLED TO A GENERATOR

(71) Applicant: GE Jenbacher GmbH & Co OG, Jenbach (AT)

(72) Inventors: Josef Thalhauser, Nussdorf (DE); Michael Perktold, Biberwier (AT); Johann Hirzinger-Unterrainer, Koessen (AT); Herbert Schaumberger, Muenster (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 29 days.

(21) Appl. No.: 14/499,811

(22) Filed: Sep. 29, 2014

(65) Prior Publication Data

US 2015/0097376 A1    Apr. 9, 2015

(30) Foreign Application Priority Data

Oct. 9, 2013    (AT) ..................................... 775/2013

(51) Int. Cl.
*F02D 29/06*    (2006.01)
*F02D 41/00*    (2006.01)
(Continued)

(52) U.S. Cl.
CPC ......... *F02D 29/06* (2013.01); *F02D 41/0007* (2013.01); *F02P 9/002* (2013.01);
(Continued)

(58) Field of Classification Search
CPC ........ F02B 41/10; F02B 37/005; F02B 63/04; F02B 77/02; F01N 13/14; F01N 13/102;
(Continued)

(56) References Cited

U.S. PATENT DOCUMENTS 5,586,540 A * 12/1996 Marzec ................... F02B 33/40
123/559.1
6,018,949 A    2/2000 Brösecke et al.
(Continued)

FOREIGN PATENT DOCUMENTS

CN    102549249    7/2012
DE    19639146    11/1997
(Continued)

OTHER PUBLICATIONS

European Search Report issued Feb. 5, 2016 in corresponding European Application No. 14003355 (with English translation).
(Continued)

*Primary Examiner* — Tulsidas C Patel
*Assistant Examiner* — Charles Reid, Jr.
(74) *Attorney, Agent, or Firm* — Wenderoth, Lind, Ponack, L.L.P.

(57) ABSTRACT

A method of operating an internal combustion engine coupled to a generator in the event of a grid fault of a power supply grid connected to the generator, in particular in the event of a dynamic grid voltage drop, wherein the internal combustion engine includes a turbocharger having a compressor in an air feed duct of the internal combustion engine and an exhaust gas turbine coupled to the compressor in an exhaust gas duct of the internal combustion engine, wherein there is provided at least one bypass valve for bypass of the compressor and/or for bypass of the exhaust gas turbine, wherein upon or after detection of the grid fault the at least one bypass valve is at least temporarily actuated.

22 Claims, 3 Drawing Sheets

(51) Int. Cl.
*F02D 23/00* (2006.01)
*F02D 17/02* (2006.01)
*F02P 9/00* (2006.01)
*F02B 37/16* (2006.01)
*F02B 37/18* (2006.01)
*H02P 9/04* (2006.01)

(52) U.S. Cl.
CPC ............ *H02P 9/04* (2013.01); *F02B 37/16* (2013.01); *F02B 37/18* (2013.01); *F02D 17/02* (2013.01); *F02D 23/005* (2013.01); *Y02T 10/144* (2013.01)

(58) Field of Classification Search
CPC ...... B60W 10/08; B60W 20/00; B60W 10/06; F02M 25/0707; F02M 25/074; F02M 25/0701
USPC .......... 123/568.11, 568.18, 568.2, 574, 90.4, 123/146, 184.54, FOR. 127; 290/52, 290/40 C, 40 R, 40 B, 41, 4 R, 40 A; 60/597, 272
See application file for complete search history.

(56) References Cited

U.S. PATENT DOCUMENTS

| | | | | |
|---|---|---|---|---|
| 7,993,582 | B2* | 8/2011 | Haga | F02D 41/0285 422/62 |
| 8,141,360 | B1* | 3/2012 | Huber | B60K 6/24 290/40 B |
| 8,307,648 | B2* | 11/2012 | Sumser | F01D 9/026 415/196 |
| 8,607,565 | B2 | 12/2013 | Sato | |
| 8,689,566 | B1* | 4/2014 | Coney | F01K 23/103 60/39.5 |
| 8,851,043 | B1* | 10/2014 | Coney | F02G 3/00 123/197.4 |
| 2004/0055299 | A1 | 3/2004 | Bernard | |
| 2004/0245783 | A1* | 12/2004 | Gilbreth | H02J 1/14 290/52 |
| 2005/0012395 | A1* | 1/2005 | Eckroad | H02J 3/16 307/44 |
| 2005/0050887 | A1* | 3/2005 | Frank | B60K 6/44 60/597 |
| 2005/0120715 | A1* | 6/2005 | Labrador | F01K 27/00 60/618 |
| 2006/0066113 | A1* | 3/2006 | Ebrahim | H02P 9/04 290/52 |
| 2008/0219866 | A1* | 9/2008 | Kwong | B60K 6/46 417/410.1 |
| 2012/0137677 | A1 | 6/2012 | Sato | |
| 2012/0175876 | A1 | 7/2012 | Pendray et al. | |
| 2012/0292921 | A1 | 11/2012 | Fahringer et al. | |
| 2013/0133480 | A1* | 5/2013 | Donnelly | B60K 6/36 74/720 |
| 2013/0213007 | A1* | 8/2013 | Harden | F02M 25/0701 60/272 |
| 2014/0216029 | A1* | 8/2014 | Gruber | C10K 1/04 60/605.1 |
| 2014/0251285 | A1* | 9/2014 | Surnilla | F02B 47/08 123/520 |

FOREIGN PATENT DOCUMENTS

| | | |
|---|---|---|
| FR | 1 438 964 | 5/1966 |
| JP | 61-58923 | 3/1986 |
| JP | 2000-257511 | 9/2000 |
| WO | 2011/088483 | 7/2011 |

OTHER PUBLICATIONS

Austrian Patent Office Search Report (ASR) issued Mar. 26, 2014 in corresponding Austrian Patent Application No. A 775/2013.
Search Report issued Jul. 4, 2016 in corresponding Chinese Patent Application No. 2014106057751 (English translation).

* cited by examiner

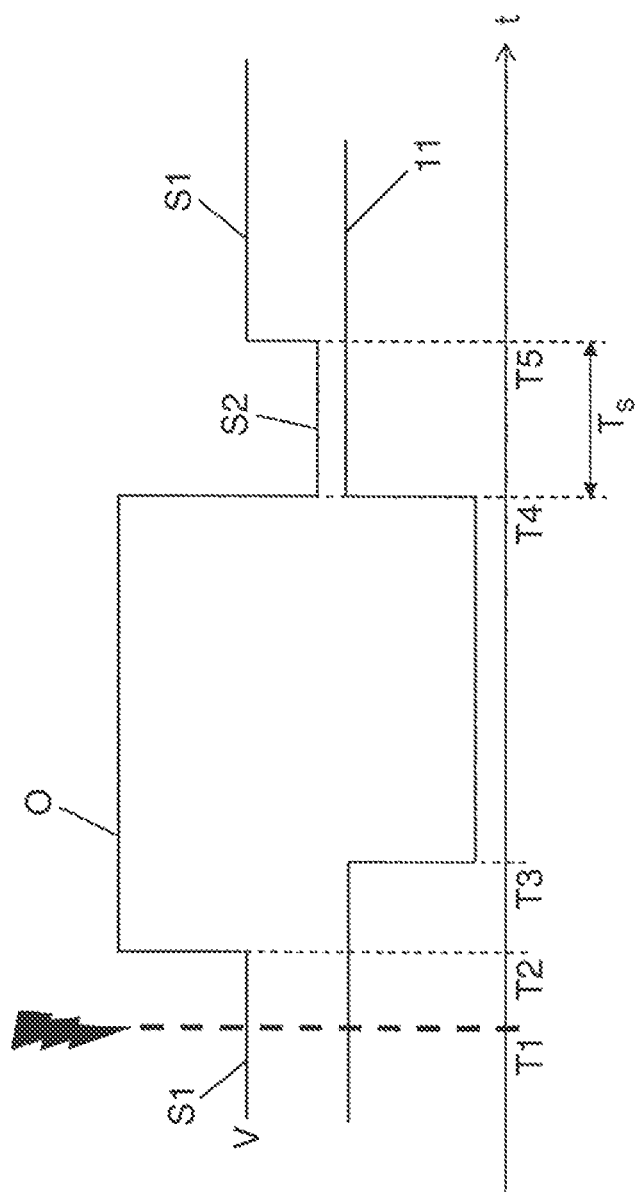

METHOD OF OPERATING AN INTERNAL COMBUSTION ENGINE COUPLED TO A GENERATOR

BACKGROUND OF THE INVENTION

1. Field of the Invention

The invention concerns a method of operating an internal combustion engine coupled to a generator in the event of a grid fault of a power supply grid connected to the generator, in particular in the event of a dynamic grid voltage drop, wherein the internal combustion engine includes a turbocharger having a compressor in an air feed duct of the internal combustion engine and an exhaust gas turbine coupled to the compressor in an exhaust gas duct of the internal combustion engine, wherein there is provided at least one bypass valve for bypass of the compressor and/or for bypass of the exhaust gas turbine.

2. Description of Related Art

In the connection of power generating installations with a generator which is to be connected to a power supply grid, the respectively prevailing grid and system rules of the corresponding power supply grid operator are to be taken into account. Those grid and system rules which are also referred to as the "Grid Code" or "Transmission Code" lay down, inter alia, technical minimum requirements and operating procedures of power generating installations in the event of a grid fault in the power supply grid. In that respect, grid faults in the form of dynamic grid voltage drops, which are also known by the term "low voltage ride through" (LVRT) events, are of relevance. Upon the occurrence of such a dynamic grid voltage drop, it is desirable for the electric phase angle, which is also referred to as the load angle or rotor displacement angle, to remain within predetermined limits as otherwise this can involve a pole slippage at the generator and, as a further consequence, uncontrolled accelerations of the internal combustion engine coupled to the generator. In addition, in the event of a grid restoration after the grid fault disappears, the mechanical loadings on the generator, the internal combustion engine and the coupling between the internal combustion engine and the generator increase with an increasing phase angle change.

A conventional measure for keeping the phase angle change within predefined limits is to deactivate the ignition in an internal combustion engine coupled to the generator. In the case of an internal combustion engine with turbocharger, however, the operating point in the compressor characteristics is shifted in the direction of the surge limit due to the ignition being switched off. If the surge limit is exceeded, that results in a stall at the compressor vanes of the turbocharger and so-called compressor surge occurs, which, as a further consequence, can lead to an unstable operating condition with respect to the internal combustion engine.

SUMMARY OF THE INVENTION

The object of the invention is to avoid the above-described disadvantages and to provide a method which is improved over the state of the art of operating an internal combustion engine coupled to a generator in the event of a grid fault in the power supply grid. In particular the invention seeks to make it possible to avoid compressor surge when a grid fault occurs, in particular a dynamic grid voltage drop, with regard to prevailing grid and system rules.

According to the invention, that object is attained by the features described below. Advantageous configurations of the invention are described below.

According to the invention, therefore, it is provided that upon or after detection of the grid fault, the at least one bypass valve is actuated at least temporarily.

The bypass valve provided can be a compressor bypass valve for bypassing the compressor in a compressor bypass duct connecting a compressor inlet to a compressor outlet. In that respect, for example, it can also be provided that an intercooler is arranged downstream of the compressor, the compressor bypass duct connecting the compressor inlet to the outlet of the intercooler.

Alternatively or additionally, an exhaust gas turbine bypass valve can also be provided as the bypass valve to bypass the exhaust gas turbine in an exhaust gas bypass duct connecting an exhaust gas turbine inlet to an exhaust gas turbine outlet.

The internal combustion engine may be a gas engine (for example, a stationary gas engine) in which a fuel (for example, fuel gas) is burnt in the presence of air. The generator may be an AC generator driven by the internal combustion engine and feeding electric current into a power supply grid connected to the generator.

The occurrence of a grid fault can be detected in a known manner, for example, by the rotary speed of the internal combustion engine or the generator rising above a predeterminable maximum value due to a failure in the power supply grid or by a generator voltage, a generator frequency or a generator current of the generator being monitored, in which case a grid fault is detected if, for example, the generator voltage drops away and/or the generator frequency rises above a predeterminable limit value and/or the generator current rises above a predeterminable limit value.

In the event of a grid fault and an ignition shut-down which is possibly linked thereto, compressor surge can be avoided by the at least temporary actuation of at least one bypass valve (that is to say, for example, the compressor bypass valve and/or the exhaust gas bypass valve) and thus the internal combustion engine coupled to the generator can be correspondingly stabilized.

In a particularly preferred embodiment, it can be provided that the at least one bypass valve has a first position prior to detection of the grid fault, wherein upon or after detection of the grid fault, the at least one bypass valve is set to an actuation position differing from the first position.

Preferably, in that respect, it can be provided that the at least one bypass valve (for example, compressor bypass valve) is opened to an actuation position which is further opened in relation to the first position.

In a particularly preferred embodiment, it can be provided that the at least one bypass valve is kept in the actuation position during a predeterminable actuation time.

Preferably, it can be provided that the at least one bypass valve is set substantially again to the first position after the predeterminable actuation time, that is to say to the position as before the dynamic grid voltage drop. In principle, however, it is also possible for the at least one bypass valve to be substantially completely closed after the predeterminable actuation time.

It has proven to be particularly advantageous if the at least one bypass valve is closed after the predeterminable actuation time to a second position which is further closed in relation to the first position and is kept in the second position during a predeterminable time, wherein preferably the at least one bypass valve is opened substantially again to the first position after the predeterminable time. By virtue of further closure of the bypass valve to the second position which is further closed in relation to the first position, it is possible to provide that the engine power output of the internal combustion engine achieves its output value again as before the grid fault more quickly.

Particularly in the case of severe grid voltage drops, it can be provided that ignition in the internal combustion engine is deactivated upon or after detection of the grid fault. In that case, there can be at least one ignition device for implementing ignition in the internal combustion engine, in which case the at least one ignition device is deactivated to deactivate the ignition in the internal combustion engine. It can also be provided that a fuel is fed for ignition in the internal combustion engine, in which case the fuel feed is interrupted to deactivate the ignition in the internal combustion engine. The ignition device can be, for example, an electrode spark plug or a laser spark plug. At least one fuel metering device, for example, in the form of a port injection valve, can be provided for the fuel feed.

Actuation of the at least one bypass valve and deactivation of the ignition in the internal combustion engine makes it possible to achieve a prolonged period of time with deactivated ignition without compressor surge occurring.

It can preferably be provided that the ignition in the internal combustion engine is activated again after the grid fault disappears. In that respect, it can be provided that the ignition in the internal combustion engine is activated again if a rotary speed of the internal combustion engine or the generator reaches a predeterminable rotary speed value and/or a relative phase angle change in the generator reaches a predeterminable value.

A particular variant provides that the at least one bypass valve has a first position prior to detection of the grid fault, wherein upon or after detection of the grid fault the at least one bypass valve is set to an actuation position differing from the first position, wherein the at least one bypass valve is set to a position differing from the actuation position after the grid fault disappears.

Usually the ignition in the internal combustion engine is switched on again only when the dynamic grid voltage drop is past. The moment in time at which the ignition is switched on again can, in that case, be determined from the rotary speed of the internal combustion engine or generator and/or from the value of the relative phase angle change. In particular, resetting the bypass valve back to its starting position as before the grid fault—that is to say to its first position—makes it possible to provide that the internal combustion engine continues to run in a stable condition again with the same power output as before the grid fault.

In principle, it can also be provided here that the at least one bypass valve is closed to a second position which is further closed in relation to the first position after the grid fault disappears and is kept in the second position during a predeterminable time, wherein preferably the at least one bypass valve is opened substantially again to the first position after the predeterminable time.

In a particularly preferred embodiment, it can be provided that, after the grid fault disappears, activation of the ignition and setting of the at least one bypass valve to a position differing from the actuation position takes place substantially at the same moment in time. In that case, ignition restoration can represent the triggering event for actuation of the bypass valve.

It can also be provided that, after the grid fault disappears, setting of the at least one bypass valve to a position differing from the actuation position takes place after activation of the ignition, preferably after a predeterminable second time after activation of the ignition.

In other words, during normal operation of an internal combustion engine, there are control reserves foreseen in the upper direction (more power) and in the lower direction (less power demand). By the present invention, the control reserves towards more power are being used. By further (as compared to its position prior to the grid event) closing the bypass valve after the grid fault has disappeared, boost pressure can be generated quickly and thus the engine quickly regains its nominal power.

BRIEF DESCRIPTION OF THE DRAWINGS

Further details and advantages of the present invention will be described by means of the specific description hereinafter. In the drawings:

FIG. 3 shows the variation with respect to time of the position of a bypass valve and the variation with respect to time of ignition of the internal combustion engine according to a further embodiment of the proposed method.

DETAILED DESCRIPTION OF THE INVENTION

Figure 1:
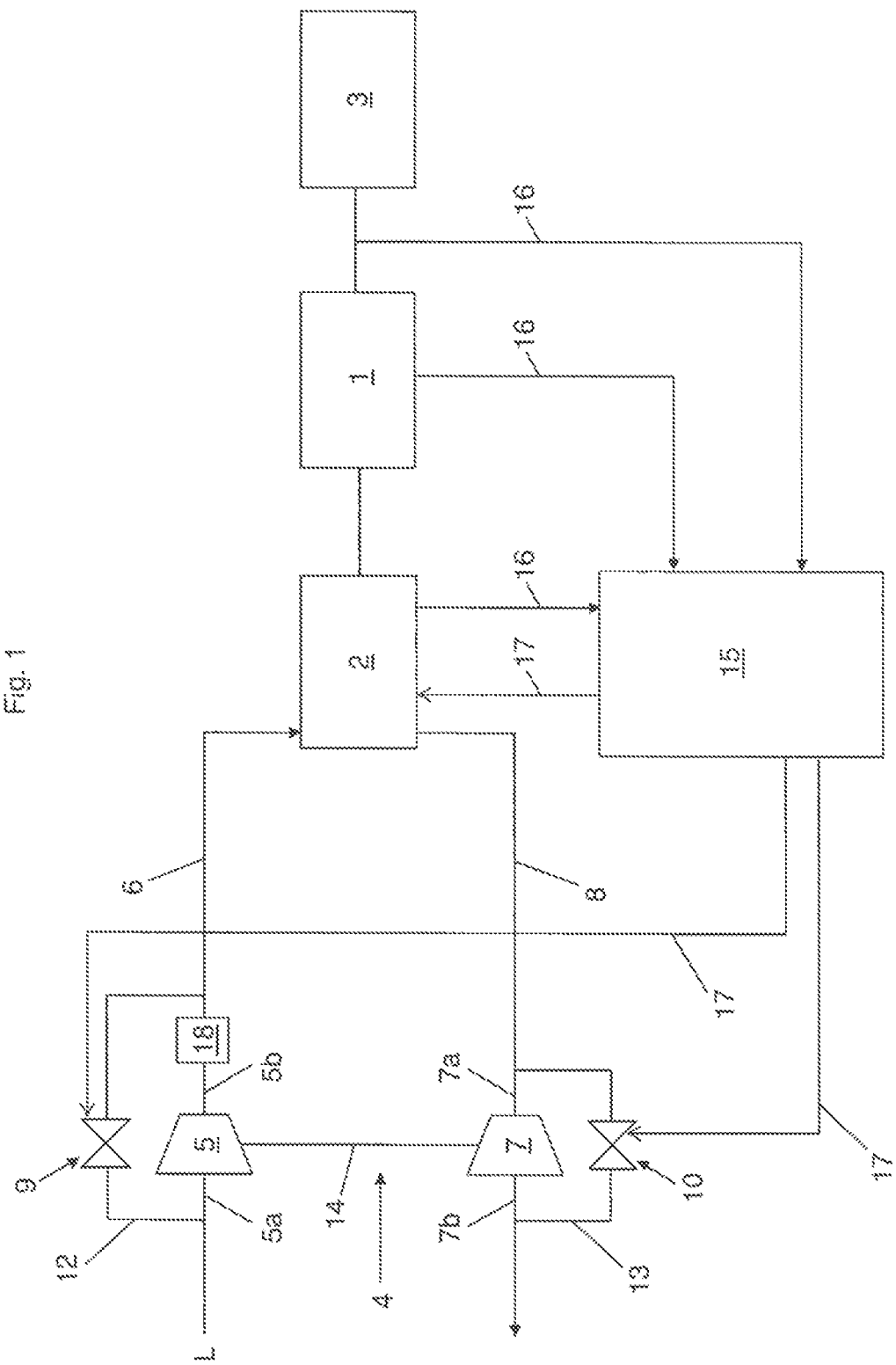
FIG. 1 shows a schematic block circuit diagram of a generator which is connected to a power supply grid and which is drivable by an internal combustion engine.

FIG. 1 shows a schematic block circuit diagram of an electric generator 1 connected to a power supply grid 3. The electric generator 1 can be an AC generator connected to a three-phase power supply grid 3. The generator 1 is coupled to an internal combustion engine 2 which, in this example, is in the form of a stationary gas engine. The generator 1 is drivable by the internal combustion engine 2 to produce electric current which is fed into the power supply grid 3. Charge air L is fed to the internal combustion engine 2 by way of an air feed duct 6. The charge air L can be, for example, a fuel-air mixture (for example, for mixture-charged internal combustion engines) or substantially only air (for example, for air-charged internal combustion engines). Exhaust gas from the internal combustion engine 2 is discharged by way of an exhaust gas duct 8. The internal combustion engine 2 is equipped with at least one turbocharger 4 which in known manner includes a compressor 5 in the air feed duct 6 and an exhaust gas turbine 7 in the exhaust gas duct 8, coupled to the compressor 5. The compressor 5 is coupled to the exhaust gas turbine 7 by way of a turbocharger shaft 14. Arranged downstream of the compressor 5 in the air feed duct 6 is an intercooler 18 for cooling the compressed charge air L. The charge air L is fed to a compressor inlet 5*a* of the compressor 5 by way of the air feed duct 6. A compressor outlet 5*b* of the compressor 5 opens into the intercooler 18.

This example has two bypass valves 9, 10 for bypassing the compressor 5 and/or the exhaust gas turbine 7. In this case, a compressor bypass valve 9 for bypassing the compressor 5 is arranged in a compressor bypass duct 12 which connects the compressor inlet 5*a* to the air feed duct 6 downstream of the intercooler 18 arranged in the air feed duct 6. An exhaust gas turbine bypass valve 10 for bypassing the exhaust gas turbine 7 is arranged in an exhaust gas bypass duct 13 connecting an exhaust gas turbine inlet 7*a* directly to an exhaust gas turbine outlet 7*b*.

Provided for the detection of a grid fault is a control device 15 which can monitor various operating parameters of the internal combustion engine 2 and/or the generator 1 and/or the power supply grid 3 by corresponding values of those operating parameters being signaled to the control device 15 by way of signal lines 16. Thus, for example, one or more of the following operating parameters can be monitored: rotary speed of the internal combustion engine 2, rotary speed of the generator 1, electric voltage of the generator 1 and/or the power supply grid 3, voltage frequency of the generator 1 and/or the power supply grid 3 and electric current of the generator 1 and/or the power supply grid 3.

If a grid fault is detected by the detection of a deviation with respect to the at least one monitored operating parameter, then the control device 15, by way of suitable control lines 17, passes adjustment signals to the compressor bypass valve 9 and/or to the exhaust gas turbine bypass valve 10 in order to actuate at least one of those bypass valves 9, 10 at least temporarily, upon or after detection of the grid fault.

In addition, a control signal can be passed to the internal combustion engine by way of a further control line 17 in order to deactivate an ignition system in the internal combustion engine 2 upon or after detection of the grid fault.

Figure 2:
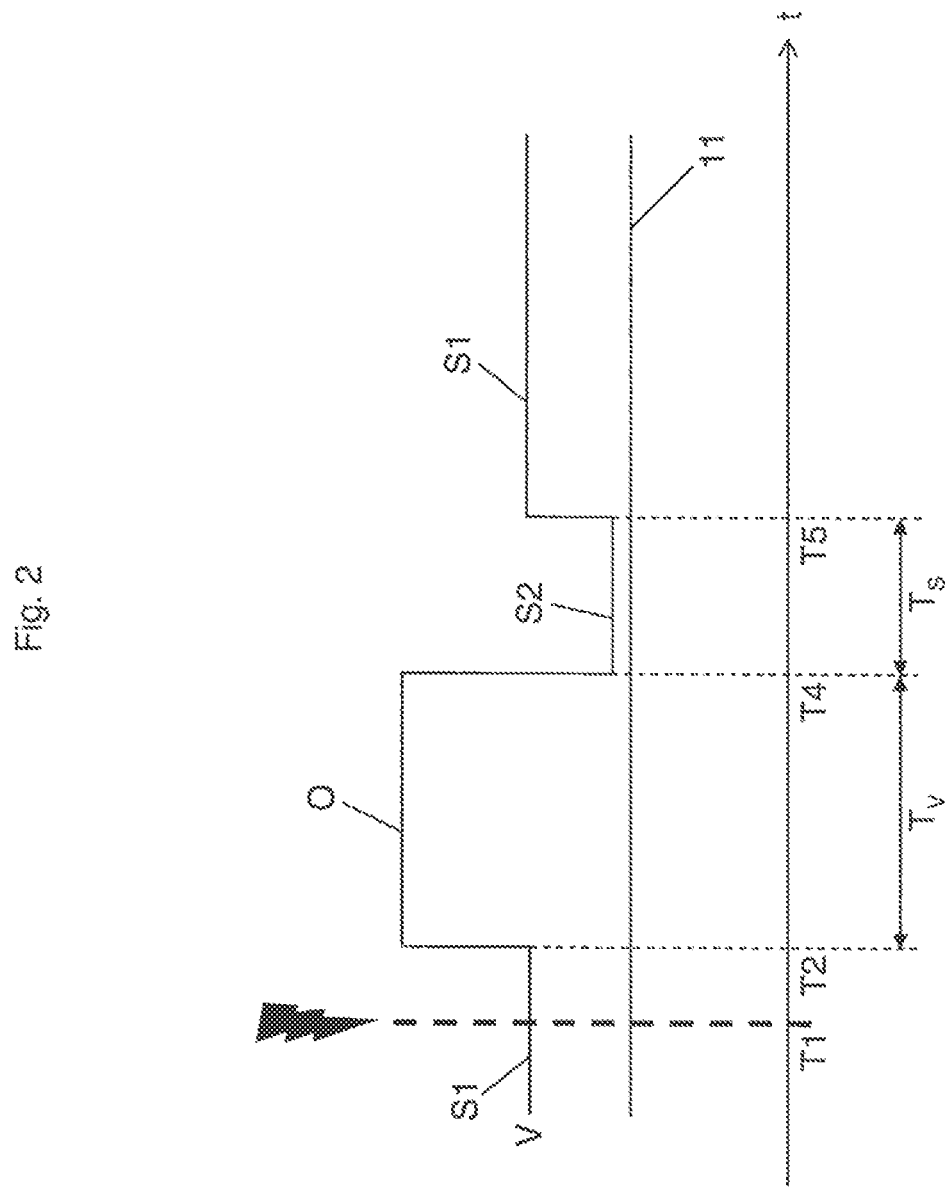
FIG. 2 shows the variation with respect to time of the position of a bypass valve according to an embodiment of the proposed method.

FIG. 2 shows the variation in a valve position V of a bypass valve 9, 10 in relation to the time t, and the variation in ignition 11 in the internal combustion engine 2 in relation to the time t. At the time T1, a grid fault, for example, a dynamic grid voltage drop, is detected. At that time, there is a bypass valve 9, 10 in a first position S1. After detection of the grid fault at the time T2, the bypass valve 9, 10 is opened, for example, into an actuation position O. The bypass valve 9, 10 is closed again after a predeterminable actuation time Tv. In the illustrated example, closing of the bypass valve 9, 10 is effected to a second position S2 which is further closed in relation to the first position S1. After a predeterminable time $T_s$, at the time T5, the bypass valve 9, 10 is moved from its second position S2 into the first position S1 again, which was the position of the bypass valve 9, 10 before the occurrence of the grid fault. During that entire procedure, the ignition 11 in the internal combustion engine 2 remains unchanged.

FIG. 3 shows the variations with respect to time of valve position V and ignition 11 in the internal combustion engine 2 similarly to FIG. 2, wherein, in this example, the ignition 11 in the internal combustion engine 2 is temporarily deactivated, in addition to the opening of the bypass valve 9, 10. After detection of the grid fault, in this example, at the time T3, the ignition 11 in the internal combustion engine 2 is deactivated and is activated again after the grid fault disappears at the time T4. In this example, closing of the bypass valve 9, 10 and activation of the ignition 11 occurs substantially at the same time T4. In comparison with the variation with respect to time of the valve position V in FIG. 2, the bypass valve 9, 10 in this example remains in the actuation position O until the ignition 11 in the internal combustion engine 2 is switched on again. After a predeterminable time $T_s$, at the time T5 the bypass valve 9, 10 is moved from its second position S2 into the first position S1 again, which was the position of the bypass valve 9, 10 before the occurrence of the grid fault.

The invention claimed is:

1. A method of operating an internal combustion engine coupled to a generator in the event of a grid fault of a power supply grid connected to the generator, wherein the internal combustion engine includes a turbocharger having a compressor in an air feed duct of the internal combustion engine and an exhaust gas turbine coupled to the compressor in an exhaust gas duct of the internal combustion engine, wherein there is provided at least one bypass valve for bypass of the compressor and/or for bypass of the exhaust gas turbine, wherein, upon or after detection of the grid fault, the at least one bypass valve is at least temporarily actuated, wherein ignition in the internal combustion engine is deactivated upon or after detection of the grid fault, wherein the ignition in the internal combustion engine is activated again after the grid fault disappears, and wherein the at least one bypass valve has a first position prior to detection of the grid fault, wherein, upon or after detection of the grid fault, the at least one bypass valve is set to an actuation position differing from the first position, and wherein the at least one bypass valve is set to a position differing from the actuation position and the first position after the grid fault disappears.

2. The method as set forth in claim 1, wherein the at least one bypass valve is opened to an actuation position which is further opened in relation to the first position.

3. The method as set forth in claim 1, wherein the at least one bypass valve is kept in the actuation position during a predeterminable actuation time.

4. The method as set forth in claim 3, wherein the at least one bypass valve is set substantially again to the first position after the predeterminable actuation time.

5. The method as set forth in claim 3, wherein the at least one bypass valve is closed after the predeterminable actuation time to a second position which is further closed in relation to the first position and is kept in the second position during a predeterminable time.

6. The method as set forth in claim 1, wherein the ignition in the internal combustion engine is activated again if a rotary speed of the internal combustion engine or the generator reaches a predeterminable rotary speed value and/or a relative phase angle change in the generator reaches a predeterminable value.

7. The method as set forth in claim 1, wherein the at least one bypass valve is closed to a second position which is further closed in relation to the first position after the grid fault disappears and is kept in the second position during a predeterminable time.

8. The method as set forth in claim 1, wherein, after the grid fault disappears, activation of the ignition and setting of the at least one bypass valve to a position differing from the actuation position takes place substantially at the same moment in time.

9. The method as set forth in claim 1, wherein, after the grid fault disappears, setting of the at least one bypass valve to a position differing from the actuation position takes place after activation of the ignition.

10. A method of operating an internal combustion engine coupled to a generator in the event of a grid fault of a power supply grid connected to the generator, wherein the internal combustion engine includes a turbocharger having a compressor in an air feed duct of the internal combustion engine and an exhaust gas turbine coupled to the compressor in an exhaust gas duct of the internal combustion engine, wherein there is provided at least one bypass valve for bypass of the compressor and/or for bypass of the exhaust gas turbine, wherein, upon or after detection of the grid fault, the at least one bypass valve is at least temporarily actuated, wherein the at least one bypass valve has a first position prior to detection of the grid fault, wherein, upon or after detection of the grid fault, the at least one bypass valve is set to an actuation position differing from the first position and is kept in the actuation position during a predeterminable actuation time, and wherein the at least one bypass valve is closed after the predeterminable actuation time to a second position which is further closed in relation to the first position and is kept in the second position during a predeterminable time.

11. The method as set forth in claim 10, wherein the at least one bypass valve is opened to an actuation position which is further opened in relation to the first position.

12. The method as set forth in claim 10, wherein the at least one bypass valve is set substantially again to the first position after the predeterminable actuation time.

13. The method as set forth in claim 10, wherein ignition in the internal combustion engine is deactivated upon or after detection of the grid fault.

14. The method as set forth in claim 13, wherein the ignition in the internal combustion engine is activated again after the grid fault disappears.

15. The method as set forth in claim 14, wherein the ignition in the internal combustion engine is activated again if a rotary speed of the internal combustion engine or the generator reaches a predeterminable rotary speed value and/or a relative phase angle change in the generator reaches a predeterminable value.

16. The method as set forth in claim 10, wherein the at least one bypass valve has a first position prior to detection of the grid fault, wherein, upon or after detection of the grid fault, the at least one bypass valve is set to an actuation position differing from the first position, and wherein the at least one bypass valve is set to a position differing from the actuation position after the grid fault disappears.

17. The method as set forth in claim 16, wherein the at least one bypass valve is closed to a second position which is further closed in relation to the first position after the grid fault disappears and is kept in the second position during a predeterminable time.

18. The method as set forth in claim 16, wherein, after the grid fault disappears, activation of ignition and setting of the at least one bypass valve to a position differing from the actuation position takes place substantially at the same moment in time.

19. The method as set forth in claim 16, wherein, after the grid fault disappears, setting of the at least one bypass valve to a position differing from the actuation position takes place after activation of ignition.

20. The method as set forth in claim 10, wherein the at least one bypass valve is opened substantially again to the first position after the predeterminable time.

21. The method as set forth in claim 1, wherein the grid fault is a dynamic grid voltage drop.

22. The method as set forth in claim 10, wherein the grid fault is a dynamic grid voltage drop.

\* \* \* \* \*